June 2, 1964 R. K. YOUTIE 3,135,831

ANSWERING ATTACHMENT FOR SOUND-RECORDING MACHINES

Filed March 27, 1961

INVENTOR

Robert K. Youtie

United States Patent Office 3,135,831
Patented June 2, 1964

3,135,831

ANSWERING ATTACHMENT FOR SOUND-RECORDING MACHINES

Robert K. Youtie, Haddonfield, N.J.
(2212 P.S.F.S. Bldg., 12 S. 12th St., Philadelphia 7, Pa.)
Filed Mar. 27, 1961, Ser. No. 98,622
7 Claims. (Cl. 179—6)

This invention relates to automatic telephone-answering apparatus, and the like.

The invention is especially concerned with an attachment or accessory for a sound-recording machine, such as an office dictating machine, whereby such a machine may be employed to automatically answer a telephone, door, intercom, and the like.

The instant invention further contemplates the provision of a uniquely simple and entirely reliable system for automatic telephone answering.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figures 1, 2, 3, 4, 5, 6, 7:
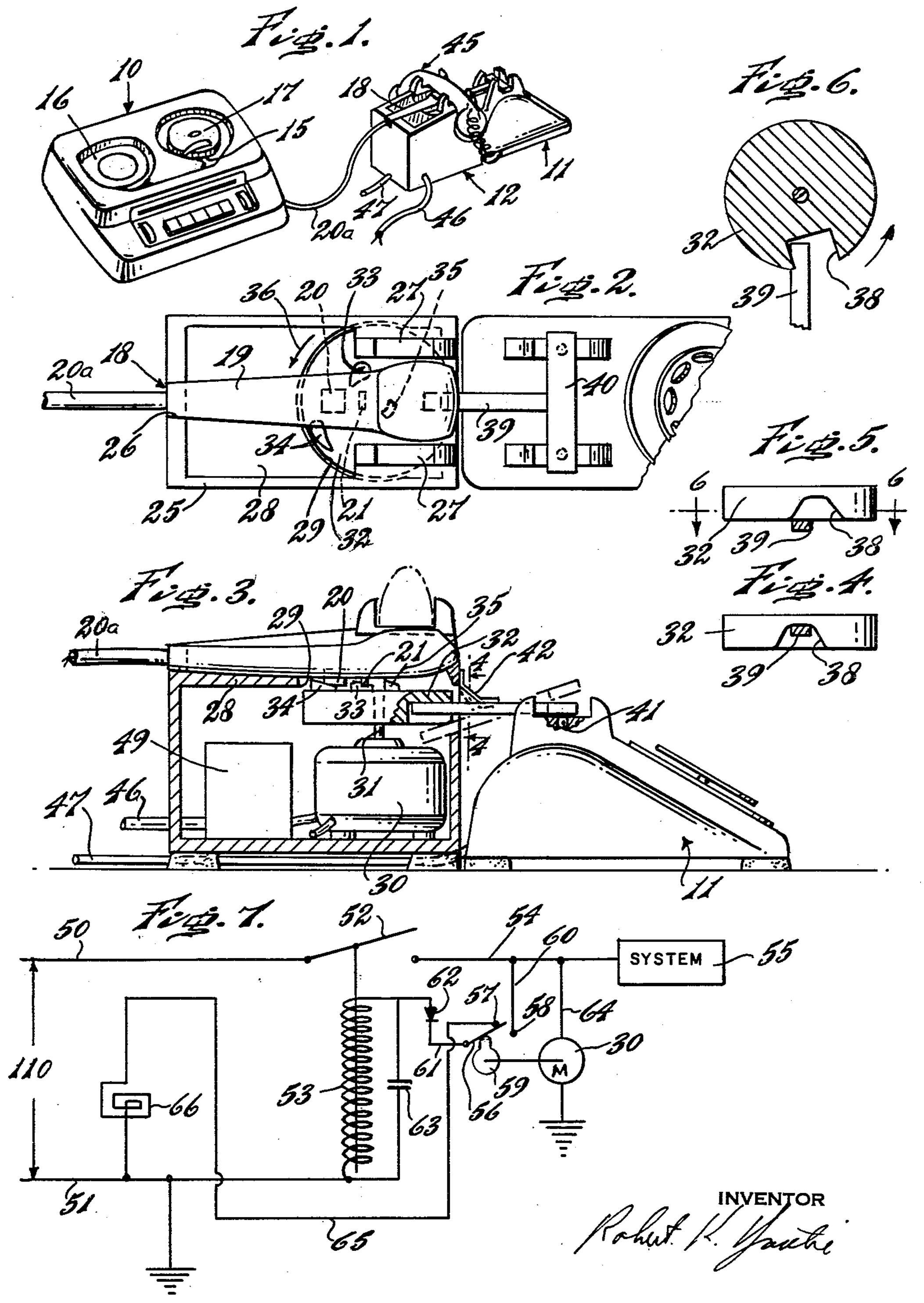
FIGURE 1 is a top perspective view showing a telephone-answering accessory or attachment of the present invention in operative association with a dictating machine and telephone.
FIGURE 2 is a top plan view showing the accessory and telephone in operative association, with the telephone handset removed for clarity of illustration.
FIGURE 3 is a longitudinal elevational view showing the accessory device and telephone of FIGURE 2, being partly in section for greater detail.
FIGURE 4 is a partial sectional elevational view taken substantially along the line 4—4 of FIGURE 3.
FIGURE 5 is a view similar to FIGURE 4 showing a slightly different position of the parts.
FIGURE 6 is a sectional view taken substantially along the line 6—6 of FIGURE 5.
FIGURE 7 is a schematic illustration of the electrical system of the instant invention.

Referring now more particularly to the drawings, an assemblage in FIGURE 1 is shown of an office dictating machine, generally designated 10, a telephone 11, and an accessory or attachment constructed in accordance with the teachings of the present invention, generally designated 12.

The dictating machine 10 may be of any suitable type adapted to record and reproduce or play back sound, and for purposes of illustration is shown as employing a magnetic tape 15 adapted to be unwound from a supply spool 16 and wound onto a take-up spool 17. Upon passage between the spools 16 and 17, the tape moves across any suitable, conventional magnetic means for recording or reproducing, as desired.

As is conventional, dictating machines are provided with a microphone, generally designated 18, which may carry manually operable buttons for controlling the functions of dictating and playback or listening. In the particular type of microphone-speaker shown in the drawings, there is provided a handgrip portion 19 of elongate configuration and connection at one end by an electrical cord 20*a* to the machine proper 10. The other end of the microphone-speaker 18 may be somewhat enlarged and carries the actual speaker unit, which is obscured and facing downward in the illustrated position. Also carried by the microphone-speaker 18, on the underside thereof as seen in the drawings, are manually actuable control buttons 20 and 21. The control button 20 may shift horizontally longitudinally of the microphone-speaker 18 for starting and stopping movement of the spools 16 and 17, while the button 21 may be of the push type, wherein pushing of the button 21 and sliding of the button 20 in one direction permits recording on the tape 15. In one commonly available model of dictating machine, a slide button 20 is movable in the rightward direction, as seen in FIGURES 2 and 3 to stop tape movement, and is movable leftward to an intermediate position to start tape movement. The button 20 is further movable leftward to start tape movement and effect quick review or playback of a predetermined, short period of the last-recorded dictation. The button 20 is resiliently biased from its extreme leftward position to an intermediate position, wherein the tape continues to proceed from the supply spool 16 to the windup spool 17. Then, the push button 21 may be pressed and a message recorded.

The accessory or attachment 12 may include a housing or case 25 having its upper side adapted to provide a support for removably receiving the microphone-speaker 18. If desired, the housing 25 may be provided at one end with a notch 26 for receiving the cord end of the handgrip portion 19, while a pair of laterally spaced cradles 27 may upstand from the housing 12 adjacent to its opposite end for receiving the speaker end of the microphone-speaker 18. Thus, the microphone-speaker 18 rests on the top wall 28 of the housing 25, being substantially immovably held thereon by engagement in the notch 26, between the cradles 27, and conforming surface engagement with the top wall, as best seen in FIGURE 3. That is, the microphone-speaker 18 is held against movement in a horizontal plane when in position on the housing 25.

It will be noted that the top wall 28 is open or cut out, as at 29 in the region of the control buttons 20 and 21 to receive the buttons in the cutout.

Mounted in the housing 25 below the cutout 29 is a motor 30 having an upwardly projecting shaft 31. On its upper end the shaft 31 carries a cam 32. On the upper side of the cam 32 are provided start and stop lugs or cam elements 33 and 34, respectively, for sequential engagement with the slide button 20 to start and stop operation of the dictating machine 10. Also provided on the upper side of the cam 32 is a cam element or lug 35 for actuating the record push button 21.

It will now be appreciated that upon rotation of the motor shaft 31 and its cam 32 in the counterclockwise direction of arrow 36, as seen in FIGURE 2, the start cam element 33 will initially engage the slide button 20 to shift the latter leftward toward its extreme position to cause a predetermined quick review and continued playback with the tape 15 progressing from the supply spool 16 to the windup spool 17. Upon movement of the cam element 35 into pressing engagement with the record push button 21, with the tape continuing in the same direction, the apparatus 10 is adapted to record a message received by the microphone-speaker 18.

Thus, during the period after the slide button is slid leftward by the start cam element 33 and until the cam element 35 reaches the push button 21, the microphone-speaker 18 may reproduce or play back a message intended for a phone caller. After the cam element 35 engages the push button 21, the microphone-speaker 18 may record a message received from the phone caller, until the stop cam element 34 engages the slide button 20 and shifts the latter rightward to its stop position.

The cam 32 may rotate at say one revolution per minute, or one-half revolution per minute to provide a cycle, respectively, of one minute or one-half minute. Also, the underside of the cam 32 may be provided with a generally radial, downwardly facing recess 38, which recess opens radially outward through the peripheral edge of the cam. A T-shaped arm or lever 39 may have its cross-piece 40 normally resting on the cradle switch buttons 41 of the telephone 11, and have its stem extending generally horizontally into the housing 25 for engagement in the nether cam recess 38, as seen in solid lines in FIGURE 3. A leaf spring 42 may resiliently connect the arm 39 to the housing 25 and yieldably urge the cross-piece 40 downward for retaining the switch buttons 41 in their open condition, while the inner end of the arm 39 is resiliently urged upward for reception in the recess 38. Upon rotation of the cam 32, as described hereinbefore, the inner end of the arm 39 will be depressed to the dot-and-dash-outline position of FIGURE 3, thereby releasing the switch buttons 41 for upward circuit-closing movement. Thus, with the telephone handset 45 removed from its receiver cradle, the arm 39 may serve to close a telephone circuit during a revolution of the cam 32, and open the circuit at the end of a cam revolution.

In use, the telephone handset 45 may be seated on top of and extending transversely across the microphone-speaker 18, being retained in position thereon by reception in the cradles 27. This may further serve to retain the microphone-speaker in position while the control buttons 20 and 21 are actuated by the cam 32.

A suitable power connection or cord 46 may extend from the housing 25, while a conventional telephone cord 47 extends from the telephone, and may extend beneath the housing 25, for a purpose appearing presently.

Interiorly of the housing 25 there may be provided electrical components for operating the above-described mechanism, the location of the components generally being at 49, see FIGURE 3, or other suitable arrangement.

The electrical circuitry may best be seen in FIGURE 7, wherein a power supply is connected across a pair of supply conductors 50 and 51. In the supply conductor 50 is located normally open contacts 52 of a relay or relay coil 53. From the contacts 52, the supply line extends at 54 to the system 55, which may be the dictating or sound-recording apparatus 10. The motor 30 is shown as connected between the conductor 54 and ground, to be energized when relay contacts 52 are closed. The motor is operatively connected to a two-way switch having an arm or blade 56 swingable between engagement with a pair of contacts 57 and 58. The motor is operative to drive cam 59 which actuates the switchblade 56 between its illustrated condition closed to contact 57, and an alternate condition closed to contact 58. The contact 58 is connected by conductor 60 to conductor 54; and, the switchblade 56 is connected by conductor 61 through rectifier 62 to one end of relay coil 53, the other end of the coil being connected to supply line 51. A condenser 63 may be connected across the coil 53, as for time delay.

The motor 30 is connected on one side by conductor 64 to conductor 54, and connected on the other side to ground. The system 55 is similarly connected to the conductor 54, so that both the motor and system operate upon closure of relay contacts 52.

The switch contact 57 is connected by a conductor 65 through a pickup coil 66 to the supply line 51. The pickup coil 66 may be inductively coupled to the bell-ringing circuit of the telephone 11, as by proper location and arrangement relative to the telephone cord 47.

In operation, with the apparatus in the condition shown in FIGURES 1–3, a calling signal operative to ring the telephone bell induces current in the pickup coil 66, which current passes through the conductor 65, switchblade 56, conductor 61, rectifier 62, and coil 53 to ground. This closes the contacts 52, placing the motor 30 and system 55 across the supply voltage and in operation. The motor operates to rotate cam finger 59 and close switch element 56 through contact 58 to the contacts 52. In this condition, line current passes through conductor 50, contacts 52, conductors 54, 60, switch 56, conductor 61, rectifier 62, coil 53, and conductor 51, so that the relay coil 53 is self-holding with respect to the contacts 52.

As the operating cam 32 rotates in the direction of arrow 36, the arm 39 is depressed out of recess 38, as shown in FIGURES 5 and 6, and actuation of the control buttons 20 and 21 occurs as described hereinbefore. During the single revolution of switch-operating cam 59, the telephone-answering and -recording functions occur as mentioned above, until the switch-operating cam opens the switchblade 56 with respect to the contact 58 and returns the switchblade to its closed relation with the contact 57, during which time the cam 32 has also completed one full revolution and a single cycle of its operation. The apparatus is then in condition for repeating its cycle by pickup of a calling signal, as by the coil 66 to energize the relay coil 53.

From the foregoing, it is seen that the present invention provides apparatus which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An attachment for a sound-recording machine including a microphone-speaker having manual dictate and listen controls, said attachment comprising cam means adapted for engagement with said controls to sequentially operate the same, a holder for removably holding said microphone-speaker in operative association with said cam means, telephone-circuit-closing means, means for operating said cam means and telephone-circuit-closing means, and means for actuating said last-named means responsive to a telephone-call signal.

2. An attachment according to claim 1, said telephone-circuit-closing means being operatively associated with said cam means for operation by the latter.

3. An attachment according to claim 1, said operating means comprising a motor, and said actuating means comprising an electrical circuit connected to said motor, a relay having normally open contacts in said circuit, pickup means connected to said relay to energize the latter responsive to a call signal, switch means connected to said relay and movable between alternate positions closed to said pickup and contacts, and switch-operating means for alternately closing said switch to said contacts and relay.

4. In combination, a holder for removably holding a microphone-speaker of a sound-recording machine having dictate and listen controls on the microphone-speaker, cam means for sequential engagement with said sound-recording machine controls when said microphone-speaker is in said holder, and actuating means responsive to a call signal for actuating said cam means.

5. The combination according to claim 4, in combination with telephone-circuit-closing means operatively associated with said cam means to be operated by the latter.

6. The combination according to claim 4, said actuating means comprising a motor, an electrical circuit connected to said motor, a relay having normally open contacts in said circuit, pickup means connected to said relay to energize the latter responsive to a call signal, switch means connected to said relay and movable between alternate positions closed to said pickup and contacts, and switch-operating means for alternately closing said switch to said contacts and relay.

7. For use with a sound-recording machine including a microphone-speaker having thereon manual dictate and listen controls, the combination comprising cam means for sequentially operating said controls, telephone-circuit-closing means, means for energizing said cam means and telephone-circuit-closing means, and means for actuating said last-named means responsive to a telephone-call signal.

References Cited in the file of this patent

FOREIGN PATENTS

| | | |
|---|---|---|
| 684,772 | Great Britain | Dec. 24, 1952 |
| 732,718 | Great Britain | June 29, 1955 |